United States Patent Office 3,497,662
Patented Feb. 24, 1970

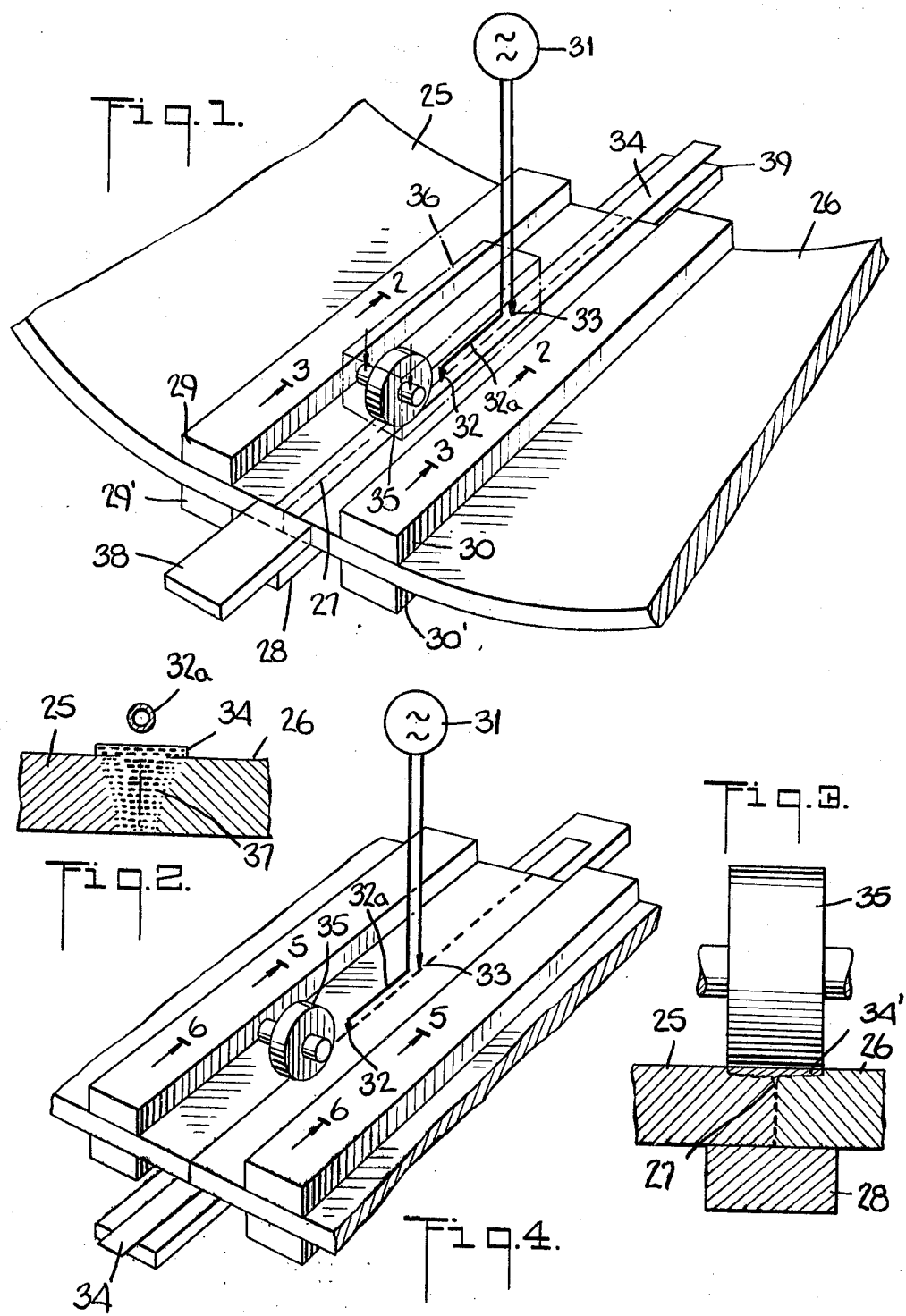

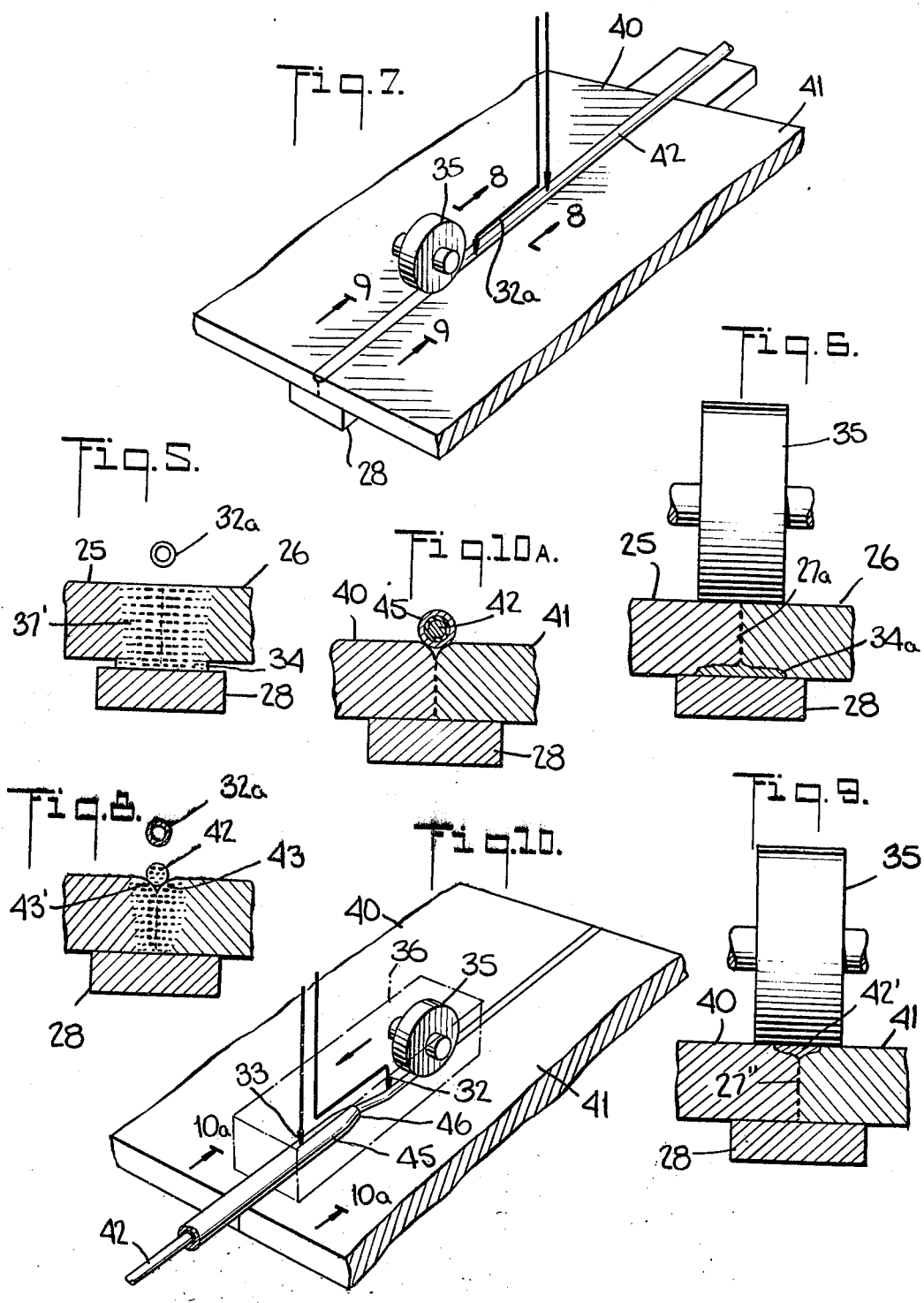

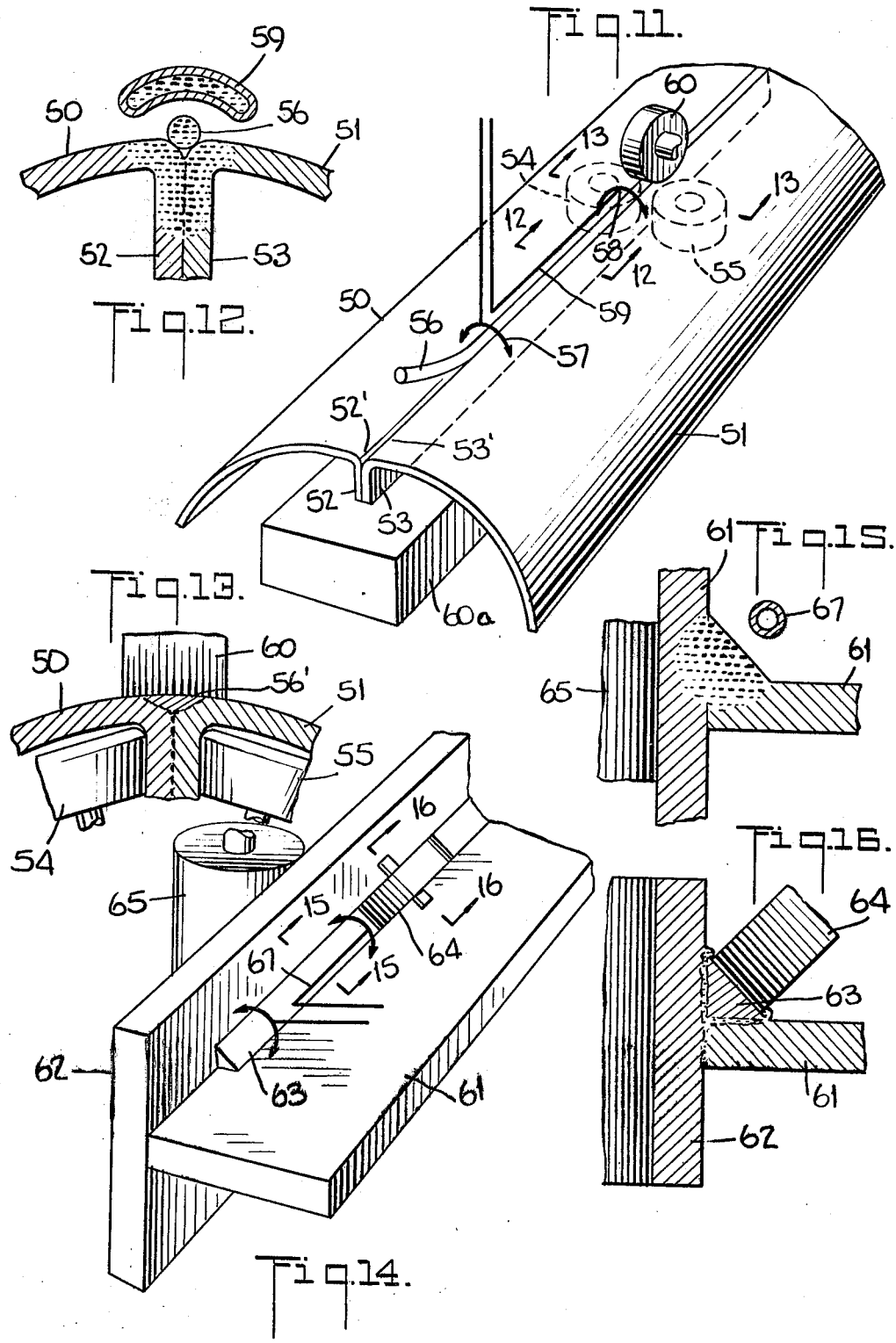

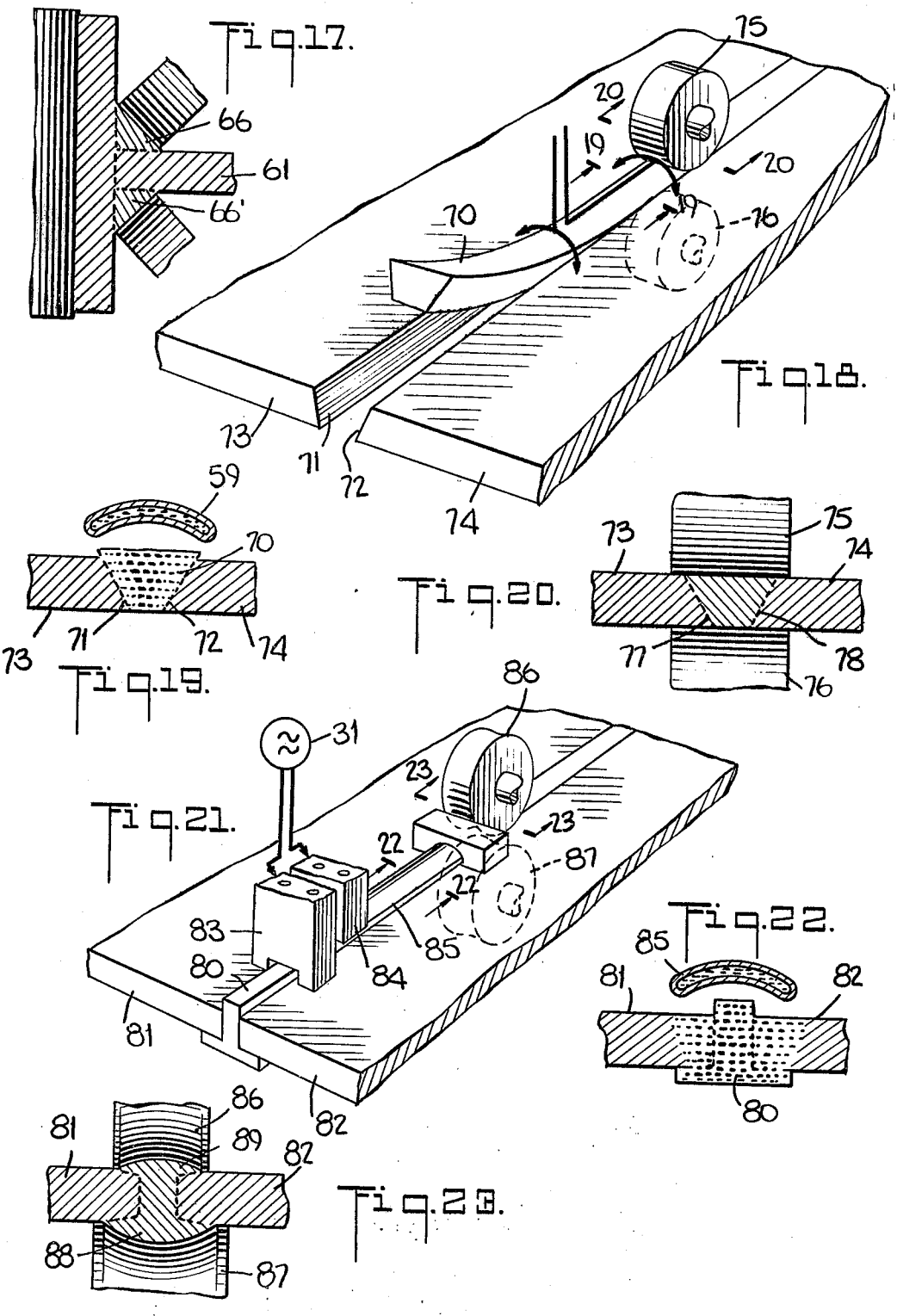

3,497,662
WELDING OF SEAMS BY HIGH FREQUENCY HEATING CURRENT WHILE FORCING WELDING METAL INTO THE SEAM
Wallace C. Rudd, Larchmont, and Jack Morris, Monsey, N.Y., assignors to American Machine & Foundry Company, New York, N.Y., a corporation of New Jersey
Filed May 5, 1966, Ser. No. 547,942
Int. Cl. B23k 9/02, 11/02, 11/04
U.S. Cl. 219—106       14 Claims

ABSTRACT OF THE DISCLOSURE

Surfaces of metal portions are welded together with a metal filler strip overlying the line of weld or between the surfaces and welded to the metal portions by causing high frequency electrical current to flow in concentrated paths in the surfaces and the strip in advance of the point where they are welded together whereby uniform and progressive heating thereof to welding temperature is obtained.

---

This invention relates to the welding of seams between metal portions by the use of high frequency heating current and more particularly doing so while forcing welding metal into the seam. Various aspects of the invention are particularly well adapted for forming butt welds and the like between metal portions in cases such as where it is impossible or impractical to force the metal portions together by sidewise pressure, that is, pressure exerted on the portions respectively from opposite sides of the seam line to force them toward each other.

In U.S. patent to Rudd and Stanton No. 2,857,503, granted Oct. 21, 1958, various methods and apparatus are disclosed for forming elongated welded seams by high frequency resistance heating, the terminals from the current source being applied respectively at successive points along the desired seam line on the longitudinally-advancing workpieces. Such "in-line" electrode methods operate quite satisfactorily for forming butt welds in cases where the workpieces may, as same are being advanced past the weld point, be readily forced under pressure together by pressure rolls at the sides, as for example in a case where the metal portions comprise opposed edges of a longitudinal gap in an advancing tube, and which readily may be advanced between pressure rolls past the weld point.

There are various situations, however, where it is quite impractical or highly inconvenient to force the metal members together at the weld point as by the use of pressure rolls at opposite sides of the weld point. For example, if it is desired to weld one end of a long coiled metal strip to the end of another so as to make a butt weld therebetween, it is not possible to establish the pressure between the edges to be welded by the known method above referred to, and in various other instances where it may be desired to form a butt-welded joint between two sheets, the two sheets would have to be, in some oftentimes impractical manner, forced into one another at an angle in order to create the pressure therebetween necessary to upset and cause welding of same together.

In the co-pending application of Wallace C. Rudd, entitled "Butt Welding of Metal Members by High Frequency Heating Current," and now Patent No. 3,293,403, certain methods and apparatus are disclosed providing a convenient and relatively simple way of meeting this problem while still performing the step per se of applying the high frequency heating current in the known manner above referred to, that is, by the use of so-called "in-line" electrodes and placing the metal sheets which are to be welded together in abutment and rigidly thus holding same in alignment with respect to each other. Then the high frequency current is applied along the line of the abutting edges by the aforesaid "in-line" electrodes, and, as the work is uniformly moved relative to the electrodes longitudinally of the desired seam line, pressure is applied as by a roll to force some of the heated plastic metal at the seam line down against the abutting edges which have now been heated throughout their depth, the pressure being sufficient to cause welding of one edge to the other. Meanwhile, the metal under pressure of the roll becomes "necked down" leaving somewhat of a groove along the seam line.

The present invention makes use of somewhat similar expedients as in the case of said co-pending Rudd application, but according to the present invention, a strip of foil, small wire or rod material, comprising a filler strip preferably formed of the same metal as the workpieces being welded, is fed into a position as the weld is being formed so as to be heated to welding temperature and then pressed down by the pressure roll against the desired seam line. Thus plastic metal of the foil or strip will be crowded into the seam line and form a part of the butt weld, and act also wholly or partly to cover and fill what would otherwise be left as an impressed groove along the seam line. Thereby a finished welded seam-line region is made possible preferably of the same overall thickness as the other portions of the sheet-metal or the like which is being welded, or even of a greater thickness, if desired. The softened metal of the foil or strip as thus used supplements the heated softened metal at the abutting edges being welded and assures a uniform high-quality weld throughout the metal thickness at the seam line.

The rate of travel of the workpieces along with the filler strip with respect to the current applying contact arrangement and the power level are made such as to heat not only the abutting edge surfaces of the workpieces to welding temperature, but also the introduced filler strip or the like which, by the applied pressure, becomes displaced so as to be at least largely impressed into the metal of the workpieces at and adjacent the seam line.

In a co-pending application of Wallace C. Rudd, Ser. No. 510,502, filed Nov. 30, 1965, a method is disclosed of welding, for example, one sheet of metal to another sheet thereunder along a desired weld line by applying high frequency current to the upper surface of the upper sheet by the use of the aforesaid "in-line" electrode system, the current having such frequency, and the metal members having such resistivity and relative permeability, that the current penetrates to a so-called "reference depth" such as to flow along through the contacting surfaces and heat same to welding temperature. That method is now sometimes referred to as the "high frequency current penetration method of welding." Similarly, with the present invention the current is caused to penetrate and heat to welding temperature the metal throughout the foil or filler strip, as well as the metal throughout the abutting edge surfaces of the work-pieces at the seam line of the desired butt weld the current being caused to flow in paths concentrated closely along the seam line in advance of the weld point. Then the pressure along such line as applied downwardly (that is in a direction along the plane of the abutting edge surfaces) reacts against a back-up bar or support for the workpieces at the seam line, so that the softened metal of the filler strip and of the adjacent abutting surfaces is confined by such supporting surface and by the still solid metal at each side of the desired seam region, the confined pressure being sufficient to weld the parts together with a weld similar to a forged-type weld. Since the heated metal becomes plastic at the welding temperature and is confined in this way, it is unnecessary to use rolls at opposite sides of the seam line for squeezing the work pieces further together at the weld point.

Heretofore there have been various proposals and attempts to form butt welds while pressing a filler strip of foil or wire down against the seam line, these proposals involving the use of heavy alternating current of ordinary low frequency flowing from one electrode or pressure roll which engages the filler strip, thence down directly through such strip and through the abutting edges at the weld region to a lower electrode. With such methods, however (as distinguished from the use of high frequency current with the present invention) the points of more rapid or intense heating will occur at the points of greatest ohmic resistance, viz. at the points of contact of the electrodes with the work and at the points of contact of the metal parts with each other, with the result that the weldment will embody overlapping so-called "nugget" formations and not be uniform. This is because at points the metal will become molten as heated to higher than the required plastic temperature for good welding and before other points reach welding temperature. Slight variations in the dimensions of the parts will also cause variations in the pressure and degree of consequent heating of the hot points. Also with such earlier proposals, the resistance heating has to all take place at the moment when the metal parts are substantially at the weld point, and thus the parts cannot be advanced and welded at high speed. And if it were attempted with such low frequency to heat the parts at the seam line in advance of and while approaching the weld point, the current and heating effect would be prohibitively distributed. But these problems are avoided with the present invention using high frequency current which is caused to penetrate to the depth of the desired weld and to flow in paths concentrated closely along the seam line as the parts advance rapidly to the weld point, for thus bringing the parts, substantially at the points of welding only, up to the welding temperature and which temperature by this method can be closely controlled. As a result, a weldment is secured in which the metal is uniform throughout and the parts fully welded together without intervening crevices or irregularities causing weakness. This is in part made possible because of the close concentration of the heating current leaving firm and solid the regions spaced from the weld, so that the metal in the weldment may be put under heavy and confined welding pressure at the weld point or points.

Various modifications and adaptions of the invention are possible, some of which will be described hereinafter, one example comprising the formation of a welded seam in the nature of a butt weld between lips of metal formed along the edges of the metal workpieces to be welded. Another embodiment may involve use of the principles of the invention with a filler strip or the like to be welded as a fillet along the corner space between workpieces arranged to have a T-like cross-section. In another embodiment, a filler strip of wedge-like cross-section may be forced between somewhat spaced-apart opposed edges of the workpieces, and so as to form a double line of welding. In yet another embodiment, the filler strip may be of a T-shaped cross-section initially and so as to be welded between somewhat spaced-apart edges of the workpiece and leaving a finished weld having a somewhat raised surface at the seam line on both upper and lower surfaces, if desired, as compared with the normal surfaces of the workpieces. In the various embodiments the seam line may be linear and straight, or it might be a girth weld, as between the ends of cylinders, tanks or pipes, in which cases the workpieces would be rotated with respect to the contact arrangements during welding.

The invention is adaptable for use with conveniently available high frequency sources of power which may have frequencies say as low as about 3000 cycles per second up to 500,000 cycles per second or higher. While preferably for efficiency and uniformity of results, the current is applied by in-line contacts or electrodes as aforesaid, the invention in certain of its aspects may conceivably be carried out with high frequency current inductively applied, preferably as by an elongated induction coil suitably constructed substantially to confine the induced current closely along a single line on the work.

Various further and more specific objects, features and advantages of the invention will appear from the description given below, taken in connection with the accompanying drawings, illustrating by way of example preferred forms of the invention.

In the drawings:

FIG. 1 is a perspective view with portions broken away illustrating somewhat schematically one of the preferred examples of the invention;

FIGS. 2 and 3 respectively are sectional views taken substantially along lines 2—2 and 3—3 of FIG. 1;

FIG. 4 is a perspective view showing portions of an alternative embodiment like that of FIG. 1, but with the foil or filler strip applied to the surface of the seam line opposite from the surface on which the current contacts are applied;

FIGS. 5 and 6 respectively are sectional views taken substantially along lines 5—5 and 6—6 of FIG. 4;

FIG. 7 shows portions of another alternative embodiment similar to those of FIGS. 1 and 4, but showing the use of a filler strip in the form of a wire instead of the foil type of strip of FIGS. 1 and 4;

FIGS. 8 and 9 are sectional views respectively taken substantially along lines 8—8 and 9—9 of FIG. 7;

FIGS. 10 and 10a show a further embodiment like that of FIGS. 7 and 8, but with an arrangement for preventing overheating of the filler strip or wire;

FIG. 11 is a perspective view, with portions broken away, illustrating somewhat schematically a still further embodiment wherein the workpieces have been formed along the desired seam line with depending lips or flanges which are to be welded together by the use of the invention;

FIGS. 12 and 13 are sectional views taken substantially along lines 12—12 and 13—13 of FIG. 11;

FIG. 14 illustrates somewhat schematically the application of the invention to the problem of welding a metal portion on edge to the surface of another metal portion, while using a filler strip which will produce a fillet-like formation along within a corner between the two workpieces;

FIGS. 15 and 16 respectively are sectional views taken substantially along lines 15—15 and 16—16 of FIG. 14;

FIG. 17 is a view like FIG. 16, but showing the formation of fillets both within the upper and lower corner spaces between the workpieces;

FIG. 18 schematically illustrates another embodiment wherein the workpieces are mounted in fixed relation to each other, but with a space along therebetween within which a filler strip of wedge-shaped cross-section is welded in place, thereby to weld the workpieces together along a pair of weld lines;

FIGS. 19 and 20 respectively are sectional views taken substantially along lines 19—19 and 20—20 of FIG. 18;

FIG. 21 is another somewhat schematic perspective view, with certain portions broken away, and showing a further embodiment in which the filler strip has a T-shaped cross-section; and FIGS. 22 and 23 respectively are sectional views taken substantially along lines 22—22 and 23—23 of FIG. 21.

Referring in further detail to FIG. 1, two strips of sheet metal are indicated at 25, 26, which are to be butt welded along a seam line 27. One or both of these strips may comprise the end portions for example of large coils of the strip material of which it is desired to weld the strip ends together for more convenient handling of same during finishing or other operations. As shown, the abutting strip end edge surfaces are brought into contact at the desired seam line and in a position to rest along on a back-up bar or other supporting means 28, while suitable clamping means having pairs of clamping jaws 29, 29', and 30, 30' are provided and mounted on any suitable means (not shown) respectively to engage the upper and lower surfaces of the ends of the workpieces 25 and 26, and thus to hold them securely in place with respect to each other on the back-up bar 28 while the welded seam is being formed.

The same or similar clamping jaws or the like may be used to hold the workpiece with their abutting or facing edges stationary with respect to each other in the various other embodiments of the invention hereinafter described, but, for simplicity in the drawings, such clamping means have been omitted in most cases.

High frequency current from a suitable source, as indicated at 31, is provided with terminal connections running to a pair of so-called "in-line" contacts or electrodes 32, 33, which apply the current at or adjacent the seam line. Like or similar high frequency contacts and current connections are used in the other embodiments described below, and same should contain cooling fluid cavities, as usual for high frequency current apparatus. A portion of one or another of these connections to the electrodes, for example the portion indicated at 32a, is positioned to extend along closely above the seam line to act as a so-called "proximity conductor," whereby the high frequency current in the workpieces will be concentrated (and its consequent heating effect also concentrated) rather closely along the region of the seam line.

A thin metal strip 34, of foil or the like, which preferably may be of the same metal as that of the workpieces 25 and 26, is fed into position to rest along on the region of the seam line and is engaged by the contacts 32 and 33. A pressure roll 35 is mounted on suitable unitary assembly frame means, if desired, together with the electrodes within the region indicated by the dotted lines 36 and so that either this assembly may be uniformly moved longitudinally relative to the seam line, or in case it is more convenient to maintain the contacts and roll means stationary, then the workpiece assembly, including the foil strip 34 and the clamping and supporting means, may instead be moved longitudinally of the seam line during the welding operation. In some cases, if desired, the roll 35 may be used as a contact in lieu of the electrode 32, and in any event, preferably immediately after the foil strip and the edge surface portions of the workpieces become heated to welding temperature by the high frequency current concentrated to flow along between the contacts, the roll 35 acts to compress the metal of the foil strip against the seam line on the workpieces, the weld point being beneath this roll.

The high frequency current flowing between the electrodes is caused to penetrate at the region of the desired butt weld to an extent such as indicated by the dotted areas 37 in FIG. 2, not only down through the strip 34 (there shown of somewhat exaggerated thickness) but also down through the region of the weld line 27 throughout the depth of the workpieces. As a result, the metal of the strip and the metal nearest to, or on the abutting end surfaces of the workpieces at least, will be substantially softened or made plastic and heated to welding temperature by the time same pass the region of the electrodes. It will be apparent that the thus-heated metal will be confined in an elongated, constricted region between the support 28 at the bottom, and between the still solid metal at points spaced to either side of the seam line in the workpieces. Thus the softened metal is engaged by the pressure roll 35 to cause a weld formation such as indicated in FIG. 3. Since the softened metal as thus confined is brought under heavy pressure, the strip 34 may be forced down into the surface of the metal of the workpieces, as indicated at 34' in FIG. 3, and some of the softened metal thereof will find its way at least slightly down into the seam line at 27'. In this way a secure, high-quality weld may be formed by heavy pressure applied in a direction along the plane of the abutting surfaces at the seam line, without the necessity of applying pressure sideways from opposed rolls, as was done as per U.S. Patent 2,857,503.

In these types of operations, the foil should have a thickness in inches possibly in the range from 0.001 to 0.060, depending upon the thickness of the pieces being butt welded. Actually, the volume of the foil material should be such as to make up for almost exactly the shrinkage in thickness that occurs because of the squeeze in the butt weld area and the resultant "necking down." In other words, the foil may make up completely for the "neck down."

If the workpieces are such that the seam line is relatively short and in cases where it is important to have the welded seam extend entirely to the edges of the workpieces, suitable conductive tabs, as at 38 and 39, may be mounted by any suitable supporting means in positions respectively at the ends of the desired seam line, such tabs serving to conduct the current from one of the electrodes to the other when the electrode assembly is in the process of starting the heating at one end of the same line, as well as when same are in the process of terminating the heating at the other end of the seam line.

If desired, also the back-up bar or support sometimes may be replaced by a roll beneath the edges of the workpieces, preferably one of sufficient width to avoid indenting the underside of the seam line region. One example of this is shown in FIG. 20 described hereinafter.

The arrangement in FIG. 4 may be the same as that above described in connection with FIGS. 1 to 3, except that here the foil strip or the like 34 is supported along on the underside of the seam line region, that is, along on the surface of the seam line region opposite from that to which the contacts and pressure roll are applied. As shown in the sectional view of FIG. 5, in this case a heating pattern will be formed, as indicated at 37', and when the parts are subjected to the pressure of the roll 35, as indicated in the cross-sectional view of FIG. 6, the softened metal of the strip 34 may largely become impressed, as at 34a, up into the undersurface of the workpieces, portions of the soft metal penetrating into the seam line, as indicated at 27a, thus forming a weld like that of FIG. 3, although upside down as compared with the latter figure.

The embodiment as shown in FIG. 7 may be like those above described, except that here two sheet metal members 40 and 41 are being butt welded along edge surfaces with the use of a filler strip in the form of a wire 42, preferably composed of the same metal as that of the workpieces. When sheet metal is sheared, the corners of the edge surfaces tend to become somewhat rounded, as indicated at 43, 43' in FIG. 8. Thus when the edge surfaces are clamped into abutting relation at the positions shown in the cross-sectional view of this figure, these rounded corner portions will conjointly form a slight groove, readily adapted to receive a filler strip in the form of the wire 42. With this embodiment, a heating pattern may be achieved, as indicated by the dotted areas in FIG. 8, and as the seam line passes under the pressure roll 35, a weld formation will occur, as indicated in FIG. 9, wherein the softened metal of the wire becomes mashed down with a generally flat upper surface and into the surface of the workpieces 40 and 41, and as indicated at 27'', portions of the metal also penetrating into the seam line.

If desired, filler strips as in the form of foil or wire may be applied both to the upper surface and the lower surface at the seam line in FIGS. 1 and 4 and in the other embodiments described below to fill in the seam line from both above and below. The foil or wire may be fed continuously into place from a suitable coil thereof and at a rate about equal to the rate of longitudinal movement of the seam line.

The arrangement as shown in FIG. 10 is like that of FIG. 7, except that here provision is made to prevent danger of overheating the wire or other filler strip means which may be used. That is, since the filler strip is of small cross-section, same may tend to become overheated and molten before reaching the weld point beneath the pressure roll, if one of the current contacts is applied to the strip as well as the workpieces at a point very substantially in advance of the weld point. To prevent this the strip may be enclosed so as to pass through a surrounding length of preferably internally insulated metal tubing, as at 45, the strip emerging from such tubing, as at a point 46 located considerably closer to the weld point. Thus the current will flow from electrode 33 to and from the electrode 32 partly by way of the metal of the workpieces adequately to heat the seam line region thereof, and partly by way of the metal tube portion 45 up to the point 46, thence along the wire of foil strip for amply heating the latter just before reaching the pressure roll 35. Insulation in the tube substantially prevents the current flow from penetrating into the strip prior to point 46. The tube 45 may be formed of a metal such as will readily withstand relatively high temperatures or, if desired, cooling fluid may be conducted therethrough to prevent heating of same or the wire 42 until it emerges therefrom. If the tube is of high conductivity metal such as copper, it will not be heated so readily by the high frequency current as will be the workpieces if of ferrous metal. The tube 45 may rest along in contact with the metal of the seam line, and thus conduct the current from the electrode 33 into the metal of the workpieces for heating same to welding temperature on the abutting surfaces upon reaching the weld point at the pressure roll, while the foil or wire filler strip, being of a much lesser cross-section, also will become heated to the weld point during the shorter interval following its emergence from the tube. The relationship of the region of the seam line with respect to the wire 42 and tube 45 is indicated in cross-section 10a—10a in FIG. 10a.

In the embodiment shown in FIG. 11, the two workpieces 50, 51, have been formed with depending lips 52, 53, which are held in place in abutting relation during the welding at the region of the weld point, as by the use of suitable clamps or by pressure rolls 54 and 55 located beneath the workpieces 50 and 51. As shown these workpieces may, for example, comprise concavo-convex strips or possibly portions of a length of tubing, or they might even be flat strips to be welded together along the abutting lips 52, 53. In bending down these lips the metal will naturally be somewhat curved, as at 52', 53', thus forming a shallow trough therebetween, into which a filler piece in the form of a wire 56 may be readily fed into place, as best indicated in the sectional view of FIG. 12. As here shown, the "in-line" electrodes may each be bifurcated, or, if desired, formed as a pair of electrodes, as indicated at 57 and 58, arranged astride the filler piece and with a proximity conductor portion, as at 59, extending along with the filler piece 56. The proximity conductor, if desired, may be of an arcuate, hollow, cooling fluid-filled cross-section, as indicated in FIG. 12. (In FIG. 11 it is shown for simplicity as a single wire, however.) In view of the positioning of the proximity conductor portion along above the filler strip, the current will be caused to concentrate along on the filler strip or wire, as well as on the closely adjacent metal along the seam line. Such bifurcated electrodes, as at 57 and 58, may, of course, be used, if desired, with the other embodiments above described and same are also preferably used with the embodiments of FIGS. 14, 18 and 21 hereinafter described. The heating pattern occurring with the arrangement of FIG. 11 and with frequencies in the range of about one kilocycle to ten kilocycles, is indicated by dotted areas in FIG. 12. Following the heating step by the high frequency current, the upper surface of the desired seam line region may be pressed downwardly as by roll 60 reacting against a suitable support 60a arranged along beneath the lips 52, 53. With a proximity conductor portion shaped as shown at 59 in FIG. 12, an improved distribution of the current may be attained for avoiding overheating of the wire filler piece and the same feature may be used in others of the embodiments, including particularly those of FIGS. 14, 18 and 21.

The sectional view of FIG. 13 indicates the form of weld which may be obtained with the arrangement of FIG. 11 and wherein it will be noted that the filler wire has been mashed down, as at 56', into the crevice between the workpieces and to a level generally flush with the latter and with portions of the plastic metal of the filler strip extending down into the seam line.

With the embodiment of FIG. 14, a workpiece 61 is being welded along its edge to a surface located at a right angle, or other angle, in respect thereto, on a workpiece 62. With this form, for example, a triangular filler piece strip, as at 63, may be fed into the corner between the workpieces and so as to form a fillet after it and the adjacent metal of the workpieces have been heated to plastic welding temperature by passing the electrode arrangement and thence passing under a roll 64 which may apply pressure reacting against a back-up roll as at 65. In the sectional view of FIG. 15, the heating pattern is indicated by the dotted areas with respect to the position of a proximity conductor portion 67. FIG. 16 is a similar sectional view, but showing the weld formation which will occur along between the meeting surfaces of the filler strip 63 and the surfaces in the corner between the workpieces 61 and 62. That is, portions of the plastic metal from the filler strip will be squeezed down to aid in the welding of the edge of number 61 to the surface of member 62 and at the same time, the filler strip surfaces will be welded to the surfaces which abut same on the main workpieces.

As shown in the sectional view of FIG. 17, two fillet strips, as at 66 and 66' respectively may concurrently be welded in place respectively within the corner formations above and below the workpiece 61 by utilizing the same heating and pressure roll arrangement as in FIG. 14, but with one set above and one set below the member 61.

It may not be essential that the filler strip initially be of a triangular cross-section, as shown at 63, 66 or 66', but instead a strip such as a wire of circular cross-section might be used, and same will become mashed into the corner formation of the workpieces to produce an adequate weld therebetween and with a fillet formation. With these arrangements also, the current frequency may be in the range of about one kilocycle to ten kilocycles, which will insure a sufficient depth of penetration of the heating current so as to cause adequate heating of all the surfaces which are to be welded together.

A variation of the embodiment of FIGS. 14 to 16 is illustrated in FIG. 18, wherein a filler strip 70 of trapezoidal cross-section is fed into position to be welded between somewhat spaced-apart beveled edges 71 and 72 on workpieces 73 and 74 respectively. In this case, as well as in the previous embodiments, it will be understood that the workpieces are normally clamped against movement with respect to each other during the welding step, but here, instead or having their edge surfaces in contact, they may be somewhat spaced apart, so that, as best indicated in FIG. 19, the trapezoidal filler piece 70 will assume a position to become wedged down in between the beveled surfaces 71 and 72, so that, after heating and after pressure is applied by a roll 75 reacting against roll 76 underneath, a weld will be formed, as indicated in the sectional view of FIG. 20, which weld essentially will be a double weld along lines 77 and 78. As indicated in FIG. 19, if the proximity conductor portion 59 is formed of the shape there shown, the current in the filler piece, as well as the resulting heat, will be distributed in the manner generally indicated by the dotted areas of this figure. As above mentioned, this as well as the other embodiments may be arranged to form either linear straight welds, or welds extending circumferentially around objects such as pipes, tanks or even submarine hulls.

With the embodiment shown in FIG. 21, a filler piece 80 may comprise a member of T-shaped cross-section which is arranged to be fed into a narrow gap or space between a pair of workpieces as at 81 and 82 which are fixed in position with respect to each other. In this figure, incidentally, a contact 83 and a support 84 are shown as conventional solid blocks of conductor material containing cooling fluid cavities, the contact 83 being shaped to straddle the filler piece, and the supporting block 84 being arranged to support a proximity conductor portion such as indicated in section at 85 in FIG. 22. This latter figure also shows in dotted lines the heating pattern which will result. The sectional view of FIG. 23 illustrates the resulting weld after the heated region has passed beneath a pressure roll 86, reacting against a pressure roll 87 located below. While these rolls might be so shaped and positioned and with sufficient pressure exerted thereon to produce substantially a "flat" weld of a thickness to be flush with the workpieces, yet as shown the rolls may have accurately grooved peripheries so that the resulting weld is rounded both on the lower side and the upper side, as indicated at 88 and 89 respectively. To achieve this type of weld, the high frequency heating current should heat to plastic condition or to welding temperature not only the entire T cross-section filler piece, but also the adjacent edge portions of the workpieces, as indicated by the dotted areas in FIG. 22. Then the upper and lower portions of the resulting weld will be encased in a complete weldment, as indicated in FIG. 22, for lending considerable additional weld strength.

In the resulting novel welded joints in each case, such as shown in FIGS. 3, 6, 9, 13, 16 and 23, the metal will be quite uniform and free of irregularities, "nuggets" or the like, continuously from one of the metal portions being welded through the distorted foil or filler strip metal and into the other metal portion with the result that the weld regions will be as strong generally as the metal at other portions of the workpieces. This general uniformity of the metal through the weld region occurs, although in the drawings the different portions of the welds are shaded or cross-hatched differently to illustrate and identify same. The uniform quality of these welds is made possible by reason of the fact that, through heating the metal with high frequency current as above described, same may be heated to a plastic or welding temperature at the regions desired and within rather critical limits and with assurance that all surfaces which are to come into welded engagement are actually heated to welding temperature, but without causing any substantial molten bodies of the metal to form. With the metal thus properly heated to welding temperature but not overheated, it becomes possible with the arrangements above described, to apply the necessary high pressure for good welding of the metal while same is closely restricted and confined between the pressure roll above and the supporting means below, in conjunction with the still solid metal at either side of the weld region.

While the invention is particularly well adapted for the welding together of ferrous metal portions, yet workpieces of other metals, such as aluminum and copper, or alloys thereof, may be welded, and in such cases the matter of attaining the critical welding temperature is particularly important and advantageous with the present method and with the high frequency heating as contrasted with other earlier methods in which such metals would tend either not to become heated to welding temperature, or would too easily become molten to make possible uniform welds in the nature of forged-type welds made under confined heavy pressure, as is possible with this invention.

It may sometimes be desirable to coat the filler strip, whether in the form of foil or wire, with a flux such as borax or other chemical flux coating material to improve the quality of the weldment by preventing oxidation and thus enabling the parts to bond more freely in forming throughout a true weld.

While at various points herein the terms "upper" and "lower" or the like are used for convenience in explaining the operation of the apparatus in the particular positions or orientations as shown, it will be understood that these terms are merely relative and that the assemblies of apparatus and workpieces may be oriented to various desired directions and positions.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for butt welding an edge surface of one metal portion to a surface on another metal portion which comprises: advancing said metal portions toward a weld point with their surfaces in opposed relation and stationary with respect to each other; depositing a metal filler strip to extend along at the desired seam line and in contact with said metal portions at least for a predetermined substantial distance in advance of said weld point; progressively, along at such seam line, heating said filler strip and said surfaces and the metal closely adjacent thereto substantially throughout the thickness of the desired welded seam up to welding temperature upon reaching said weld point by causing high frequency current to flow in paths at said surfaces and in said strip and concentrated along said line and to flow toward and away from said weld point from and to points which are in advance of and spaced from said weld point by at least said predetermined distance, said frequency being so related to the characteristics of the strip and said metal portions that the current will penetrate at least into said strip and into said metal portions and will heat said strip and the metal portions to be joined thereto and including said surfaces to the desired welding temperature as they are advanced toward, and by the time they reach, the weld point; providing means supporting the thus-heated metal of said metal portions at least at the region of said weld point; and, while in their relatively stationary positions with respect to each other, also applying pressure to the heated filler strip and to the adjacent heated metal at said weld point in a direction toward and reacting against said support and sufficient to impress at least a substantial amount of the filler strip metal into welded relation therewith astride the desired seam line.

2. Method in accordance with claim 1, and in which the high frequency current is applied by electrodes located at successive points spaced in the direction of the seam line, and the current being concentrated along such seam line and said filler strip by a proximity conductor portion of the high frequency circuit which extends from one said electrode to adjacent another of said electrodes and in proximity to but spaced from said seam line, the current frequency being so related to the characteristics of the strip and metal portions that it will penetrate and heat to welding temperature the strip and the metal portions to a reference depth at least substantially that of the welded seam being formed between the metal portions.

3. Method in accordance with claim 2 and in which the surfaces of the metal portions to be welded are positioned substantially parallel to each other and are retained stationary with respect to each other with their said opposed surfaces in contact throughout the major extent thereof, and the metal filler strip is deposited to extend along on the line of contact thereof.

4. Method in accordance with claim 2 and in which the electrodes are applied on the same side of the metal portions and the filler strip is deposited on the same surface region of the metal portions as that to which the electrodes are applied.

5. Method in accordance with claim 2 and in which the electrodes are applied on the same side of the metal portions and the filler strip is deposited on the surface of the metal portions opposite from the side to which the electrodes are applied.

6. Method in accordance with claim 3 and in which the filler strip lies on top of the metal portions before welding and is impressed to a level flush with the surfaces of the metal portions astride the seam line.

7. Method in accordance with claim 2 in which the surfaces to be welded are positioned substantially parallel to each other and in contact throughout the major extent thereof and in which the filler strip as deposited is in the form of metal foil which has a width greater than the distance between said opposed surfaces and which has a face thereof bridging the line of contact between said surfaces.

8. Method in accordance with claim 2 and in which the filler strip as deposited is in the form of wire which has a diameter greater than the spacing between said opposed surfaces.

9. Method in accordance with claim 2 and in which the surfaces of the metal portions which are to be welded together comprise opposed contacting lips of metal extending along the edges of the metal portions and which have been deflected into depending positions with respect to the normal surfaces of the metal portions.

10. Method in accordance with claim 8 and in which the edge surfaces are in contact throughout the major extent thereof and the corners of the edge surfaces of the metal portions are somewhat rounded and form therebetween a crevice into which the wire filler strip is deposited.

11. Method in accordance with the foregoing claim 2 and in which the current is applied to flow along a path on the metal portions extending to a greater distance in advance of the weld point than the path on which the heating current flows on the filler strip in advance of the weld point, the difference between the path lengths being such that the metal portions and strip are brought to welding temperature substantially concurrently.

12. Method in accordance with claim 1, and in which one of the metal portions is welded on edge to an extended surface of the other of the metal portions and the filler strip is caused to become welded as a fillet extending along in the corner formed between the metal portions.

13. Method in accordance with claim 2, and in which opposed edge surfaces on the metal portions are somewhat beveled in opposite directions and the filler strip used is of a substantially wedge-shaped cross-section with surfaces which become wedged between and welded to said beveled surfaces by virtue of the heating thereof and the pressure applied thereto.

14. Method in accordance with the foregoing claim 1 and in which opposed edge surfaces of the metal portions are spaced apart and the filler strip used is of a substantially T-shaped cross section before heating thereof and is disposed with its vertical portion deposited between said surfaces, and said pressure acting to compress said filler strip into welded relation between such surfaces and filling the gap therebetween with its upper and lower portions bulging outwardly with respect to the normal surfaces of the metal portions.

References Cited

UNITED STATES PATENTS

| | | | |
|---|---|---|---|
| 3,293,403 | 12/1966 | Rudd | 219—102 X |
| 3,359,402 | 12/1967 | Rieppel | 219—107 X |
| 3,383,489 | 5/1968 | Ciranko | 219—106 X |
| 1,640,798 | 8/1927 | Murray | 219—106 |
| 3,073,945 | 1/1963 | Osterer et al. | 219—67 |
| 1,674,109 | 6/1928 | Grob | 219—106 X |
| 2,066,668 | 7/1937 | Bennett | 219—67 X |
| 2,281,805 | 5/1942 | Schenk | 219—106 |
| 2,992,319 | 7/1961 | Stanton et al. | 219—67 |

JOSEPH V. TRUHE, Primary Examiner

L. A. SCHUTZMAN, Assistant Examiner

U.S. Cl. X.R.

219—104, 107